RADIO RELAY WITH FALSE RECEIVER SIGNAL SUPPRESSION
Filed April 2, 1947
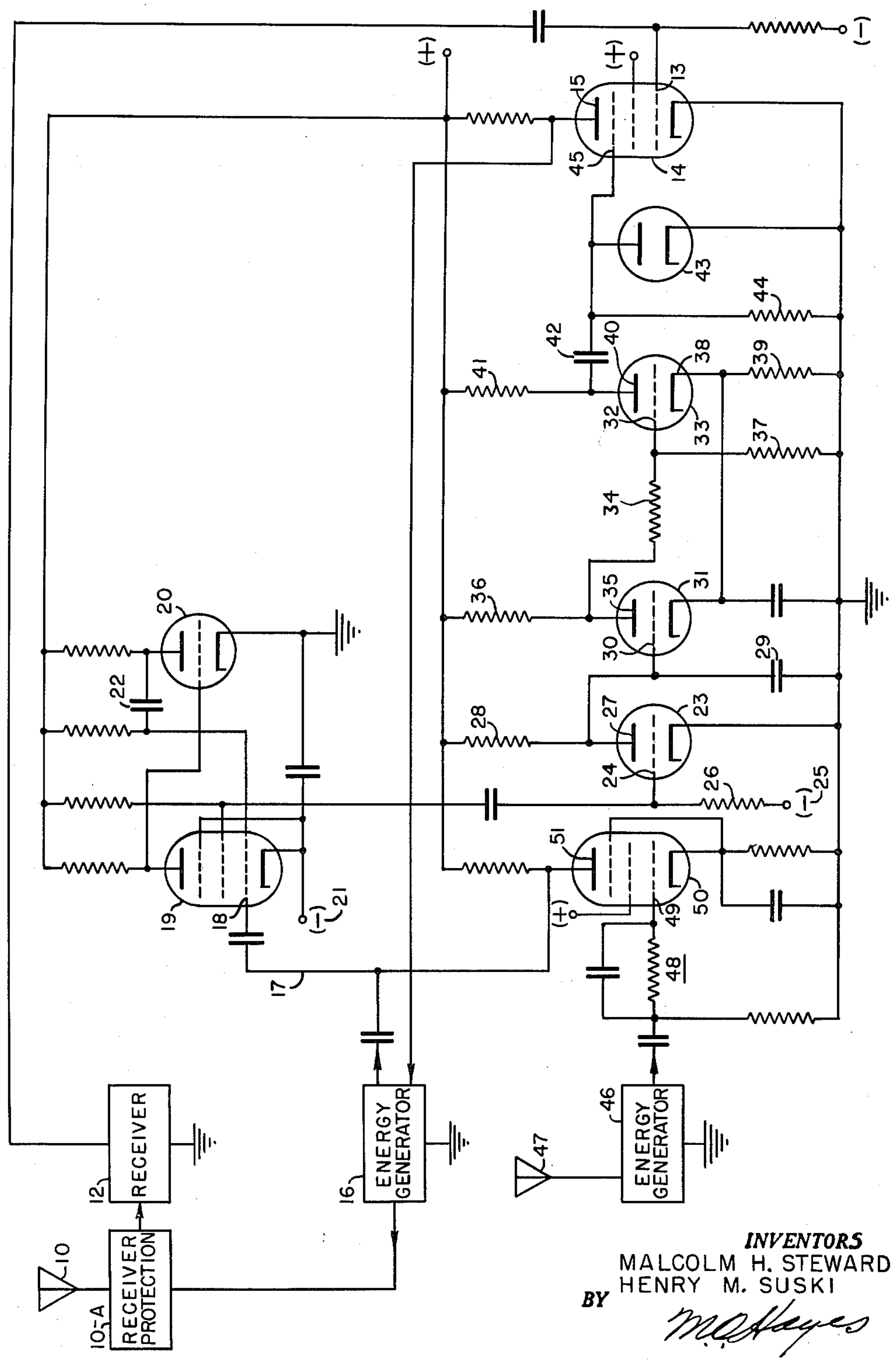
INVENTORS
MALCOLM H. STEWARD
HENRY M. SUSKI
BY M. A. Hayes
ATTORNEY 2,736,797

RADIO RELAY WITH FALSE RECEIVER SIGNAL SUPPRESSION

Henry M. Suski, Washington, D. C., and Malcolm H. Steward, Los Angeles, Calif.

Application April 2, 1947, Serial No. 738,904

1 Claim. (Cl. 250—15)

(Granted under Title 35, U. S. Code (1952), sec. 266)

This invention relates to electrical communication systems and in particular to communication systems designed to respond with the generation of electrical energy signals of high power upon receipt of incoming energy signals.

In numerous applications of communication equipment, particularly in the line of identification, it is desirable to have a system capable of responding with the generation of energy pulses upon receipt of selected electrical energy pulses from a distant source. A system for such a purpose would typically include a receiving system adapted to amplify incoming energy signals present in an input channel. The amplified signals resulting are then employed to drive a power signal generator to produce electrical energy signals of high power. Where large reflective objects are located in the path of outgoing energy from the power signal generator, reflection therefrom of a part of the generated energy may cause false generation of a second pulse of energy by the equipment. Such operation is not desired and is to be avoided whenever possible. In addition to the power signal generator associated with the equipment, other signal generator devices may be located in the vicinity. These signal generator devices may operate at carrier frequencies capable of amplification by the receiver system and hence may cause the generation of energy either upon direct reception or upon return of energy from reflective objects.

Accordingly it is an object of the present invention to provide apparatus in equipment as outlined above for suppressing receiver output signals in periods during which power generated locally is apt to cause undesired operation of the equipment.

Another object of the present invention is to provide in communication equipment as outlined, apparatus suppressing receiver output signals for a selected period of time following the start of energy generation by a local energy source.

Other and further objects and features of the present invention will become apparent upon a careful consideration of the accompanying drawing and descriptions.

The single figure of the drawing is representative of a typical communication system designed for minimum response to undesired signals generated by near-by sources.

In accordance with the fundamental concepts of the present invention, an electrical communication system is provided which is capable of responding with the generation of high power electrical energy pulses upon the receipt of incoming signals. The incoming signals are applied through suitable amplification devices to an energy generator to initiate pulse operation thereof. In the signal path from receiver to energy generator a gated amplifier stage is provided which will permit the transfer of signals to the energy generator only during selected periods of time. Gating of this amplifier is produced by bias varying apparatus holding the amplifier inoperative for a period of time immediately following the generation of energy by local sources. To produce this gated operation, control signals produced in time coincidence with the generation of energy by the local sources are caused to operate a timing pulse generator to produce a pulse of selected duration. From this timing pulse is derived a control signal having selected characteristics for gating the amplifier.

With particular reference now to the figure, a communication system is shown which is adapted to receive and transmit pulses of energy via the antenna 10, receiver protection devices of conventional nature being employed in block 10–A. Incoming energy intercepted by antenna 10 is applied to a suitable receiver 12 which includes demodulation apparatus for reproducing the modulation signal placed on the incoming energy. The modulation signal is applied to the grid 13 of an amplifier tube 14. Amplified output signals from the anode 15 of tube 14 are supplied to a local energy generator 16 to initiate the production of reply energy thereby. Energy produced by generator 16 is then radiated through antenna 10. If a portion of this emitted energy strikes a nearby reflecting object so that it is reflected in sufficient amplitude to be amplified by receiver 12 and applied through tube 14 to the energy generator it is seen that repetitive operation of the energy generator 16 will be obtained.

To prevent such repetitive operation of the energy generator 16 a timing signal produced in coincidence with the start of energy generation by energy generator 16 is supplied through line 17 to grid 18 of tube 19. Tube 19 together with tube 20 forms a one-shot multivibrator circuit in which tube 20 is preferably maintained in a normally non-conducting condition by virtue of the return of the cathode of tube 19 to a negative supply 21. The leading edge of a negative pulse applied to grid 18 produces an interruption in the current flow in the tube 19 resulting in switching action of the multivibrator circuit placing tube 20 in a conductive condition. This conductive condition in tube 20 persists until the coupling capacitance 22 discharges sufficiently to permit the potential of grid 18 to rise above cut-off, thereby causing the multivibrator to return to its normal state.

A saw-tooth voltage generator tube 23 is maintained in a normally non-conductive condition by virtue of the return of the grid 24 thereof to a negative potential 25 through resistance 26. The anode 27 of tube 23 is connected to the positive supply through resistance 28 and is by-passed to ground by capacitance 29. In the normally non-conductive condition of tube 23 there is a large potential difference across capacitance 29. When tube 23 is rendered conductive as a result of the existence of the non-conductive condition in the screen grid circuit of tube 19, the low anode resistance of tube 23 provides a discharge path for capacitance 29 permitting a rapid drop in the voltage thereacross. When tube 23 is returned to the non-conductive condition, capacitance 29 begins an exponential charge at a relatively slow rate toward the positive supply potential.

Also connected across capacitance 29 is the grid 30 of an electron tube 31. Tube 31 is maintained in a normally conductive condition by virtue of the connection of grid 30 through the resistance 28 to the positive supply potential. The conductive condition is interrupted by the drop in potential produced across capacitance 29 due to conduction by tube 23. This interruption lasts until capacitance 29 recharges sufficiently to raise grid 30 above the cut-off potential.

The control grid 32 of the electron tube 33 is connected through resistance 34 to the anode 35 of tube 31. Resistance 34, together with the anode resistance of tube 35 and resistances 36 and 37 produces a voltage division network placing a low positive potential at grid 32 in the quiescent condition of conduction by tube 31. Simultaneously the cathode 38 of tube 33 is maintained at a relatively high positive potential because of the flow of anode current from tube 31 through the common cathode resistance 39. The non-conductive condition in tube 33 is altered as a result of cessation of anode current flow in tube 31 which raises the potential of grid 32 sufficiently to permit conduction by anode 40 of tube 33. The resulting drop in potential across the load resistance 41 is coupled through capacitance 42 and the clamper network including electron tube 43 and resistance 44 to a control grid 45 of coincidence tube 14. During this period of conduction by tube 33 it is therefore impossible for received signals applied to grid 13 to render anode 15 of tube 14 conductive.

Frequently it is desired to operate a second energy generator as indicated by numeral 46 in the vicinity of the generator 16 and receiver 12. Such a generator may typically radiate pulse energy by a separate antenna 47. This energy may be of a frequency to which receiver 12 is responsive sufficiently to cause operation of the coincidence tube to operate energy generator 16 falsely. A suppression signal derived from energy generator 46 is applied through the coupling network 48 to the grid 49 of an amplifier tube 50. Anode 51 of tube 50 is connected to line 17 to supply a control signal to grid 18 as mentioned above to produce the non-responsive condition in tube 14 so that generator 16 cannot be keyed.

From the foregoing discussion it is apparent that considerable modification of the features of the present invention is possible and while the device herein described and the form of apparatus for the operation thereof constitutes a preferred embodiment of the present invention it is to be understood that the invention is not limited to this precise device and form of apparatus and that changes may be made therein without departing from the scope of the invention as defined in the appended claim.

The invention described herein may be manufactured and used by or for the Government of the United States of America for governmental purposes without the payment of any royalties thereon or therefor.

What is claimed is:

In combination, signal reception means, first energy generating means operative to produce high power electrical energy signals; coupling means including a vacuum tube having at least first and second control grids for coupling the output of said signal reception means to said energy generating means, said coupling means being operable to trigger said energy generating means upon receiving an output signal from said signal reception means, the output of said signal reception means being applied to one of the control grids of said vacuum tube; pulse shaping means the output of which is applied to the other control grid of said vacuum tube, said pulse shaping means being operable to disable said coupling means for a predetermined time-interval after application of a pulse to the input of said pulse shaping means; second energy generating means; pulse forming means plurally connected to said first energy generating means, to said second energy generating means, and to said pulse shaping means, said pulse forming means being adapted to apply a pulse to said pulse shaping means upon actuation of either said first energy generating means or said second energy generating means.

References Cited in the file of this patent

UNITED STATES PATENTS

| | | |
|---|---|---|
| 2,425,315 | Atwood et al. | Aug. 12, 1947 |
| 2,448,016 | Busignies | Aug. 31, 1948 |
| 2,453,970 | Charrier | Nov. 16, 1948 |
| 2,460,202 | Tyson | Jan. 25, 1949 |
| 2,543,454 | Gaerttner | Feb. 27, 1951 |
| 2,592,777 | Williams | Apr. 15, 1952 |
| 2,605,460 | Storck | July 29, 1952 |